Aug. 19, 1969 G. H. ASHTON 3,461,648
PACKAGING APPARATUS
Filed Aug 28, 1967 4 Sheets-Sheet 2

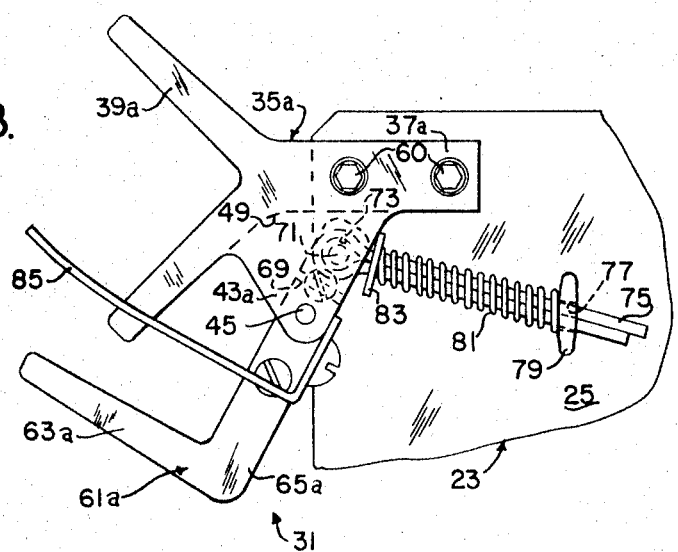
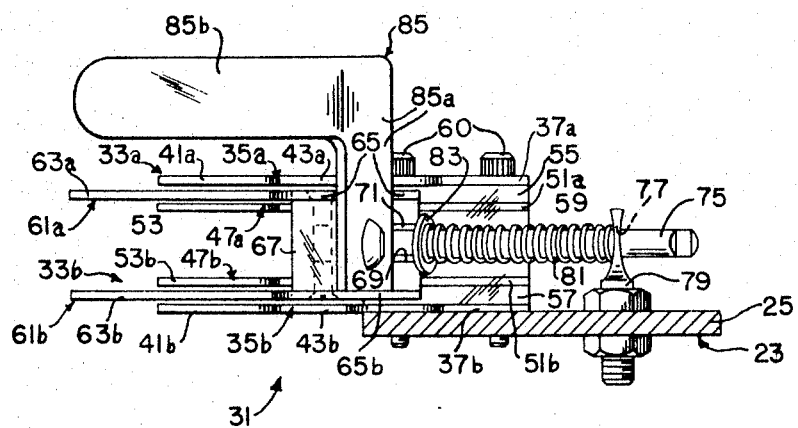

Aug. 19, 1969   G. H. ASHTON   3,461,648

PACKAGING APPARATUS

Filed Aug. 28, 1967   4 Sheets-Sheet 4

United States Patent Office 3,461,648
Patented Aug. 19, 1969

3,461,648
PACKAGING APPARATUS
George H. Ashton, St. Louis, Mo., assignor to Bemis Company, Inc., Minneapolis, Minn., a corporation of Missouri
Filed Aug. 28, 1967, Ser. No. 663,574
Int. Cl. B65b 43/26, 9/12, 51/30
U.S. Cl. 53—183                    11 Claims

ABSTRACT OF THE DISCLOSURE

Apparatus for packaging items, particularly produce, in heat-sealable plastic tubular open-mesh netting comprises a turret rotatable about a vertical axis having a loading tube platform at its upper end. A series of spaced loading tubes carried by the platform each register with an opening in the platform. Each tube holds on the exterior thereof a supply of rucked netting which is fed upwardly over the top of the tube and down through the respective opening in the platform. A series of clamping units are carried by a supporting platform beneath the loading tube platform and rotate with the loading tube platform. There is one clamping unit for each of the tubes, and each unit comprises upper and lower sets of clamping jaws spaced from each other so that the netting can be bunched and held between the upper and lower sets of jaws of the clamping unit. A heated sealing and severing blade is engageable with the bunched portion of the netting between the upper and lower sets of clamping jaws to segment the netting and form a seal on both segments of the netting.

BACKGROUND OF THE INVENTION

There has been increasing use of the heat-sealable plastic tubular netting sold under the trade name Vexar by E. I. du Pont de Nemours & Company, Inc., of Wilmington, Del., for packaging produce, e.g., grapes sold in supermarkets, and with this has arisen a need for packaging equipment to facilitate the operation of packaging the produce in the supermarket. Generally, such packaging operations have been carried out using preformed Vexar bags, but this has involved tedious and time-consuming operations. Also, one of the problems involved in such packaging has been that of providing a tag on the package for marking the weight and/or price of the package.

SUMMARY OF THE INVENTION

Accordingly, among the several objects of the invention may be noted the provision of a low-cost easy-to-use apparatus for use in supermarkets for facilitating packaging produce in tubular Vexar netting, and which, of course may have other uses; the provision of such apparatus which utilizes continuous lengths of tubular Vexar netting, as distinguished from using preformed bags; and the provision of such apparatus adapted for forming packages of various sizes.

Apparatus of this invention for packaging items in heat-sealable plastic tubular netting comprises an endless conveyor having an upper stage, an intermediate stage, and a lower stage. A series of loading tubes carried by the upper stage are spaced at equal intervals therearound. Each of the loading tubes is adapted to hold on the exterior thereof a rucked supply of netting. A series of clamping units carried by the intermediate stage are spaced at equal intervals therearound corresponding to the spacing of the loading tubes. Each clamping unit comprises an upper set of clamping jaws and a lower set of clamping jaws spaced from the upper set. The conveyor is adapted for indexing movement to index each loading tube and the associated clamping unit to each of several stations. One of the stations is a loading station at which the netting having its lower end previously bunched and sealed may be drawn down for support of its lower end on the lower stage of the conveyor and for loading of the lower portion of the tubing below the intermediate stage via the loading tube, after which the portion of the netting at the level of the intermediate stage may be bunched and inserted in the respective clamping unit and the upper and lower sets of clamping jaws of the unit closed to clamp the bunched portion of the netting at two vertically spaced points. A second of the work stations is a sealing and segmenting station having a fixed heated sealing and severing blade positioned for engagement by the bunched portion of the netting between the upper and lower sets of clamping jaws on indexing movement of the conveyor to carry the loaded netting to the sealing and segmenting station. The blade acts to form a seal for the upper end of the loaded portion of the netting and to form a seal for the lower end of the portion of the netting thereabove, and to segment the netting therebetween.

Other objects and features will be in part apparent and in part pointed out hereinafter.

BRIEF DESCRIPTION OF THE DRAWINGS

FIG. 3 is an enlarged plan of a clamping unit of the apparatus of the invention, showing the unit in an open position for receiving bunched netting;

FIG. 4 is an elevation of the clamping unit in its open position;

Corresponding reference characters indicate corresponding parts throughout the several views of the drawings.

DESCRIPTION OF THE PREFERRED EMBODIMENT

Figure 6:
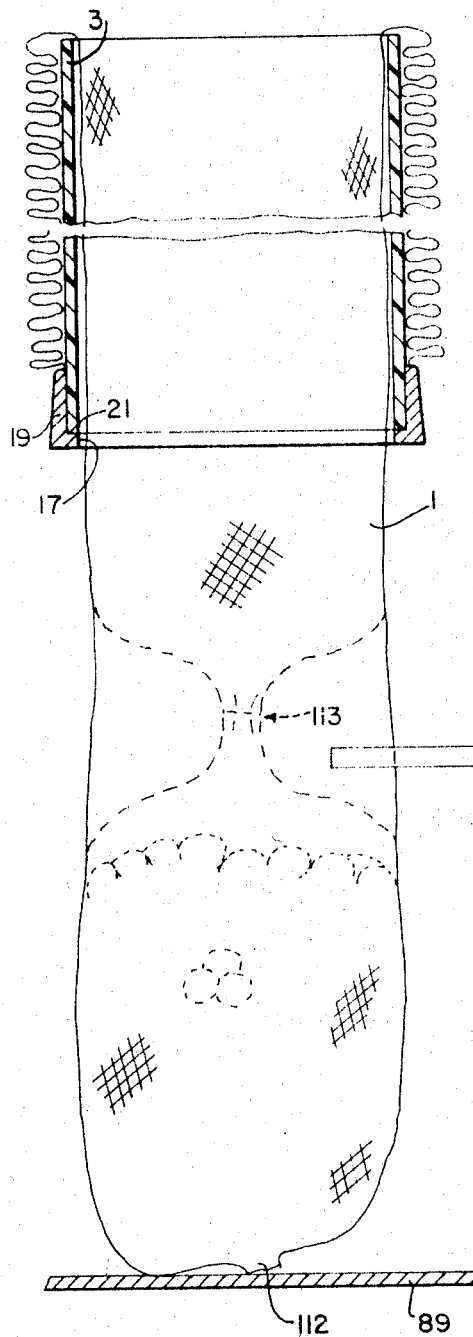
FIG. 6 is a diagrammatic section illustrating packaging of items according to the invention.
Figure 7:
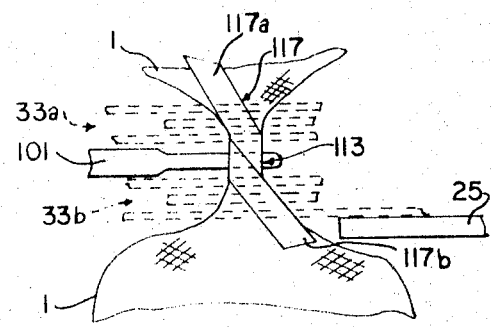
FIG. 7 is a fragmentary view illustrating the bunched portion of the netting with a tape wrapped therearound held by the clamping units for severing and sealing by the heated blade of the apparatus.
Figure 8:
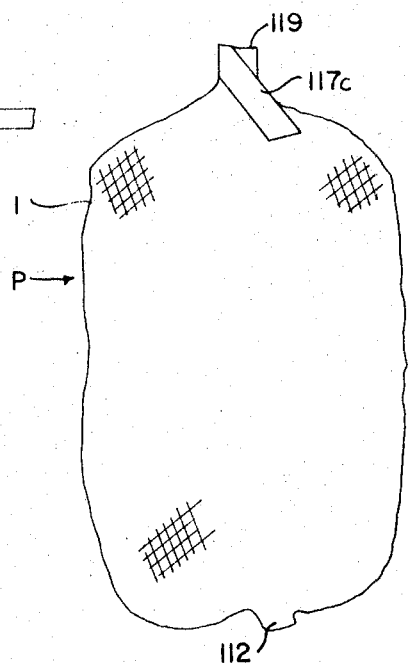
FIG. 8 is a view of a completed package.

Apparatus of the invention is used for packaging items in Vexar or other heat-sealable plastic tubular netting designated 1 in FIGS. 6–8. The netting is supplied on tubes 3. A supply of the netting is rucked or gathered on the exterior of the tube as shown in FIG. 6.

Figure 1:
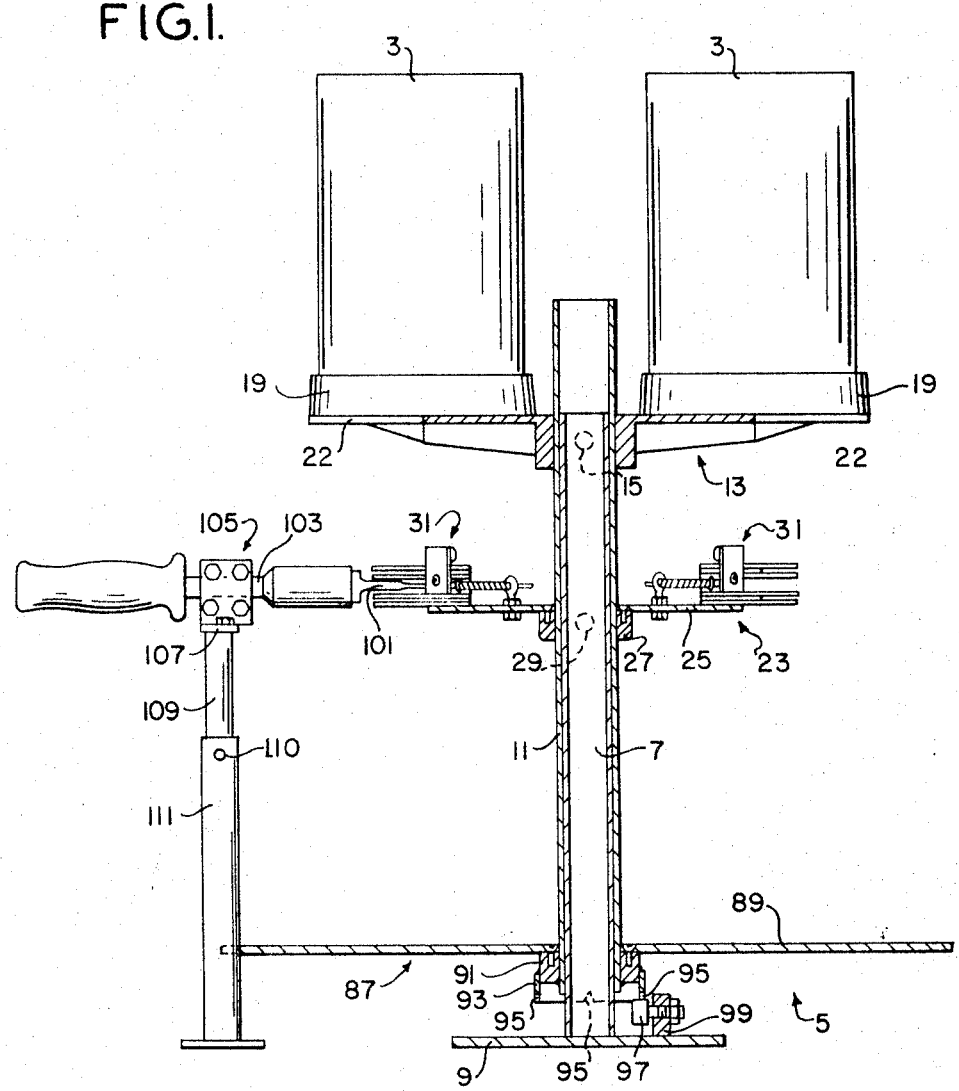
FIG. 1 is a vertical section, taken on line 1—1 of FIG. 2 showing packaging apparatus of the invention.
Figure 2:
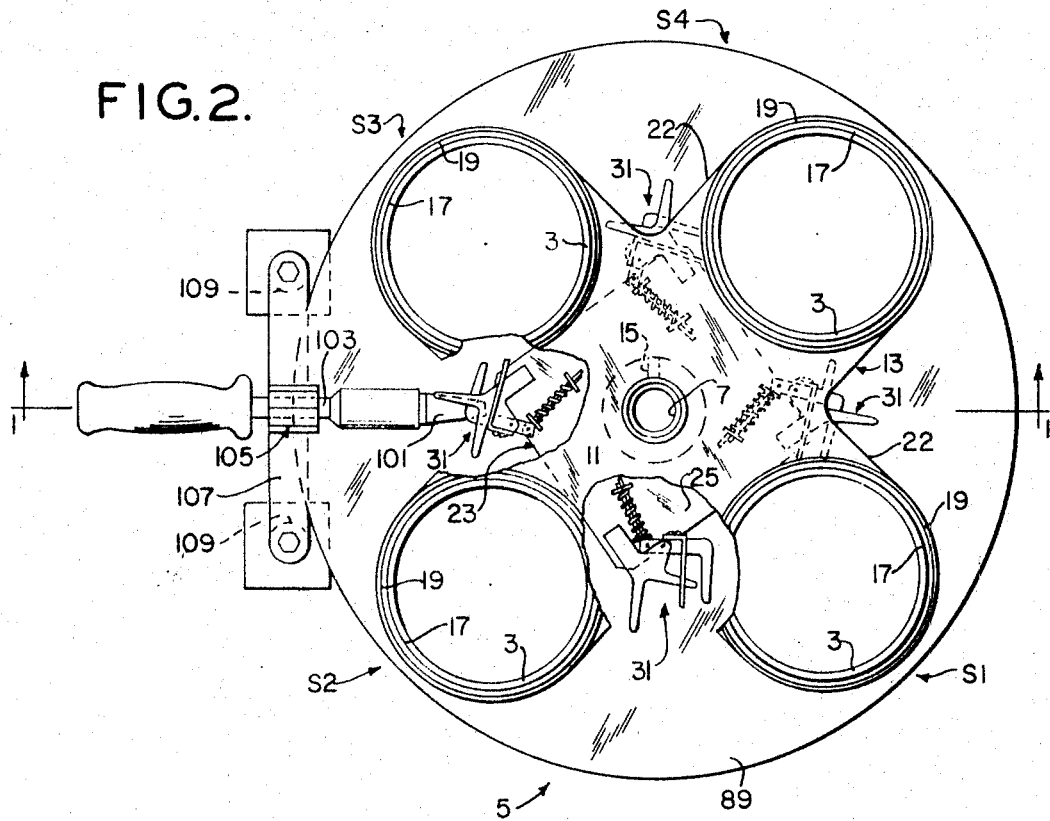
FIG. 2 is a plan of the apparatus with portions broken away.

Referring now to FIGS. 1 and 2, packaging apparatus of this invention comprises an endless conveyor in the form of a turret 5 rotatable about the vertical axis of a post 7 which extends upward from a base 9. The turret includes a sleeve 11 telescoped over post 7, rotatable about the post, and free to move vertically on the post. A loading tube platform 13 comprises the upper stage of the conveyor or turret and is secured to the upper end portion of sleeve 11 by a set screw 15. This mounts the platform 13 for rotation with the sleeve and permits vertical adjustment of the platform with respect to the sleeve. Platform 13 has a series of circular openings 17 therein spaced at equal intervals around the axis of post 7. Each of the openings 17 is surrounded by a short upwardly projecting cylindrical rim 19 concentric with the respective opening. Each rim is slightly larger in inside diameter than the opening 17 and the outside diameter of tube 3 and has an annular shoulder 21 (FIG. 6) on which rests the lower end of the tube 3. Rims 19 form guides for the tubes as they are placed on the platform and hold them in place on the conveyor. The platform is cut away between adjacent tubes as shown at 22 in FIG. 2 to enhance the operator's view of the lower stage of the conveyor and to decrease the weight of the platform.

The conveyor has an intermediate stage 23 comprising a square clamp-supporting platform 25 secured to a collar 27 on sleeve 11. The entire intermediate stage 23 of the conveyor is vertically adjustable with respect to the sleeve 11 and is fixed to the sleeve in any of its adjusted positions by a set screw 29 threaded in collar 27. Spaced at equal intervals around the platform 25 are a series of four clamping units each of which is generally designated 31. As shown in FIG. 2, the spacing of the clamping units corresponds to the spacing of the openings 17 in the upper platform, and the clamping units are offset relative to openings 17 so they lie substantially midway between two adjacent openings. The reason for this offset is to maintain the space below each opening 17 clear for loading of the netting drawn down through the opening.

Figure 5:
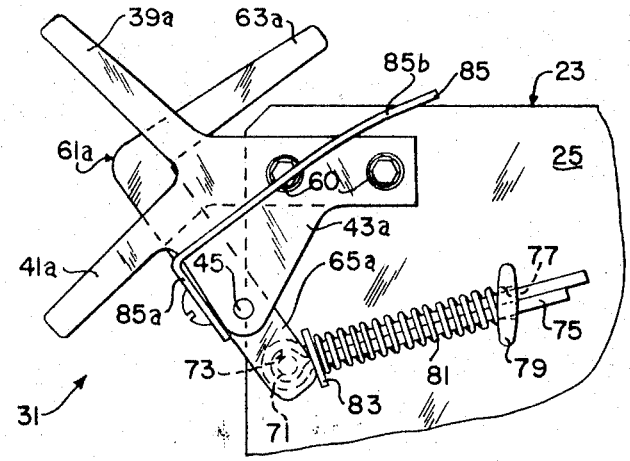
FIG. 5 is a view similar to FIG. 3 showing the clamping unit in its closed position.

Referring to FIGS. 3-5, each clamping unit 31 comprises an upper set of clamping jaws 33a spaced from a lower set of clamping jaws 33b, the sets of jaws being substantially the mirror image of each other. The upper set of jaws comprises an outer member 35a which has a base portion 37a positioned over platform 25 and a bifurcated end portion comprising arms 39a and 41a disposed relative to each other at an included angle of about 90° thereby forming a wide mouth at the outer end of the clamp for receiving bunched netting. A projecting portion 43a between base 37a and arm 41a receives the upper end of a pivot pin 45.

The inner member 47a of the upper set of clamp jaws is essentially the same as member 35a except that it is cut away along a line designated 49 in FIGS. 3 and 5 to thereby eliminate the projecting portion 43a. Thus, member 47 comprises a base portion 51a (FIG. 4) and a pair of outwardly projecting arms 53a, one of which is shown in FIG. 4. The similar parts of members 35a and 47a are aligned one above the other and separated by a spacer 55.

The lower set of clamping jaws 33b comprises an outer member 35b and an inner member 47b which are identical to the outer and inner members 35a and 47a previously described. Accordingly, the same reference numbers followed by the letter "b" have been used to designate like parts for the lower set of clamp jaws. The lower end of pin 45 is received by clamp member 41b. The lower clamp members are separated from each other by a spacer 57 and the inner members 47a, 47b of both clamp sets are separated by a spacer 59. Spacers 55, 57 and 59 are positioned between the base portions only of the clamp members. The spacers and the clamp members 35a, 35b, 47a, 47b are fixed to the platform 25 by a pair of mounting bolts 60 so that the arms 39a, 41a, etc. project from the sides of the platform.

Between the inner and outer members of each set of clamping jaws there is a center or closing clamp member of generally L-shape, the upper one of which is designated 61a and the lower one of which is designated 61b. Since these clamp members are substantially identical only the clamp member 61a will be described in detail. The closing clamp members comprise a pair of arms 63a and 65a which jointly define an included angle of about 90°. The closing clamp members are separated by a spacer 67 (FIG. 4) between arms 65a and 65b. The pivot 45 passes down through arms 65a, 65b and through the spacer 67 thereby to pivotally mount the clamp members 61a, 61b between the projecting portions 43a, 43b of the outer clamp members. The closing clamp members are swingable about pivot 45 between the position shown in FIGS. 3 and 4 wherein the clamp unit is open to receive netting 1 and the position shown in FIG. 5 wherein the clamp unit is closed for gripping netting at two spaced points, i.e., at the upper and lower sets of jaws.

The end of spacer 67 at the outer end of arms 65a, 65b is slotted in a horizontal plane as shown at 69. A pin 67 extends vertically through the slot and passes through the eye 73 of a toggle rod 75. The rod 75 may be a standard cotter pin. The shank of the cotter pin or rod 75 projects loosely through a hole 77 in a rod support member 79 extending above the platform 25. A spring 81 coiled around the shank of the cotter pin reacts from the support 79 against a washer 83 abutting spacer 67 for exerting a biasing force on the clamp members 61a, 61b. During each movement of the clamp closing members 61a and 61b from one position to the other position, initially the rod 75 slides through hole 77 and spring 81 is compressed and opposes movement of the clamp. However, when the longitudinal axis of the rod passes the vertical axis of pin 45, then the clamp members are biased toward their intended position by the force of spring 81 reacting from the rod holder 79 against spacer 67. Thus an overcenter spring device is provided which is capable of biasing the closing clamp members either toward their open position or toward their closed position.

The clamp members 61a, 61b are moved between their open and clamping positions by a handle 85 which has a lower leg 85a secured to the spacer 67 and an upper leg 85b disposed at right angles to the lower leg. Leg 85b is positioned above the upper clamp member 35a where it is easily grasped by the operator of the apparatus for opening and closing the clamp. As shown in FIGS. 3 and 5, leg 85a of the handle engages the projections 43 of the outer clamp members for stopping movement of members 61 when the clamp unit is either opened or closed.

Conveyor 5 has a lower stage generally designated 87 which comprises a table 89 formed by a large circular plate coaxially positioned around sleeve 11 and attached to a collar 91. The collar is secured to the lower end portion of the sleeve so that the table rotates with the sleeve. A ring 93 carried by collar 91 projects from the lower edge of the collar and has four notches 95 opening to the lower edge of the ring and spaced at 90° intervals. Notches 95 are adapted to receive a roller 97 carried by a support 99 on base 9, and when the roller is aligned with a notch the conveyor is held against inadvertent rotation. This permits the conveyor to be indexed for movement of each loading tube successively from a station S1 to stations S2, S3 and S4 (FIG. 2), and back to station S1, the conveyor being detained at each of these stations by registration of a notch and the roller 97. The lower edge of the ring rides on roller 97 as the conveyor is advanced between stations. Thus the conveyor is generally in the form of a turret rotatable about the vertical axis of the post 7 to index each loading tube and associated clamping unit from one station to the next so that during 360° of rotation each of the tubes 3 and the associated clamping unit moves from station S1 to S2 to S3 to S4 and returns to S1.

A heated blade 101 is provided for severing and sealing a bunched portion of the netting between the upper and lower sets of clamping jaws 33a and 33b brought from station S1 to S2. A support for the blade comprises a stem 103 which is clamped at 105 to a horizontal blade support plate 107. The ends of the plate are connected to the upper ends of a pair of posts 109 which telescope into two spaced stanchions, one of which is shown at 111. The posts are vertically adjustable in the stanchions and can be fixed in various adjusted positions by set screws such as shown at 110 in FIG. 1. This permits the height of the cutting blade to be adjusted until it is positioned in a plane passing midway between the upper and lower sets of clamping jaws 33a and 33b.

As previously indicated, the turret is indexed for locating each tube 3 at each of the four stations designated S1, S2, S3 and S4. Station S1 may be referred to as a loading station wherein items such as produce (e.g., grapes) are placed in the netting. It also constitutes an unloading station at which packaged items are unloaded. Station S2 may be referred to as a sealing and segmenting station wherein the netting is severed and sealed at the ends of packages by the blade 101. Stations S3 and S4 may be referred to as cooling stations, where the seals made by the blade are allowed to cool.

Produce is packaged according to the method of the invention by positioning four of the tubes 3 containing rucked netting material on the platform 13 comprising the upper stage of the conveyor or turret and feeding rucked netting over the upper ends of the tubes and then down through the interior of the tubes and through the respective openings 17. Platform 25 is vertically adjusted according to the height of a package resting on table 89. Blade 101 is then adjusted until it is in a plane passing between the sets 33a, 33b of clamp jaws. The lower end portion of the netting extending down through one of the tubes is then bunched and sealed together. This may be accomplished at station S1 by bunching the end portion of the netting, placing it in the clamping unit 35 just to the left of the respective tube, swinging the clamp to the closed position to thereby clamp spaced portions of the netting between the upper and lower sets 33a and 33b of the clamping jaws, and then indexing the turret to move the netting to the sealing station S2 for engagement of the blade 101 with the bunched end portion of the tubing extending between the sets of clamping jaws 33a and 33b thereby to sever the netting and simultaneously seal the netting at both sides of the blade. This forms the lower seal 112 of the first package.

When the lower end of the netting on each tube has been sealed, then produce (e.g., grapes) to be packaged is fed down through tube 3 at station S1 and the netting is pulled downwardly until the lower end of the netting rests on table 89. This brings the produce down beneath the plane of the clamp supporting platform 25 as shown in FIG. 6. Next the portion of the netting at the level of the clamping unit is bunched as shown in dotted lines in FIG. 6, the bunched netting being designated 113. The bunched portion of the netting is inserted into the jaws of clamp 31 to the left of the tube 3 at station S1, the clamp being in the open position at this time as shown in FIG. 2. As the bunched netting is inserted into the clamping unit the handle 85 is engaged to swing the clamping unit from the open position shown in FIGS. 3 and 4 to the closed position shown in FIG. 5 so that the bunched netting 113 is gripped between the upper and lower sets 33a, 33b of clamping jaws with part of the bunched material being stretched between the jaws. This is the condition shown in FIG. 7.

Then the turret is indexed to advance the bunched netting to station S2 where heated blade 101 severs the netting between the sets of clamp jaws and, simultaneously, forms a top seal 119 above the produce being packaged and forms the bottom seal 112 of the next package. The package P (FIG. 8) is then complete. The turret is indexed to advance the package to station S3, thence to S4 and back to S1 where the clamp unit is opened for unloading of the package. The seals cool at stations S3 and S4. Then, another loading operation is carried out at station S1 and the operation repeated. Ultimately, the operation proceeds with a package being loaded at station S1, sealing and severing occurring on a package at station S2, and cooling of the seals on packages at stations S3 and S4.

On indexing around of a bunched and clamped portion of the netting from station S1 to S2, the bunched portion (which is relatively taut between the upper and lower sets of clamping jaws) actually comes into contact with the blade 101 just before reaching station S2. At this point, a notch 95 (which is of inverted V-shape) has just started to come into register with roller 95. As the blade melts its way through the bunched portion of the netting, the turret completes its indexing movement under the camming action of the notch (note that the weight of the turret effects such a camming action).

It will be observed that the clamping unit 31 for any given tube 3 is offset from that tube in forward direction with respect to the rotation of the turret (which is clockwise as viewed in FIG. 2). Thus, the clamping unit 31 for the tube 3 at station S1 is offset to the left of this tube. The blade 101 is similarly offset forward from the tube 3 at station S2. Thus, when the tube at station S1 is indexed to station S2, the bunched portion of the netting caught in the clamp unit 31 which was at station S2 is brought around to the blade for being severed and sealed.

The package can be provided with a price tag by spirally wrapping around the bunched netting 113 a strip of tape 117 (FIG. 7) of heat-sealable plastic material, such as polyethylene, with end portions 117a and 117b of the tape extending upwardly and downwardly, respectively, so that they are held against the netting by the sets of clamping jaws. Tape 117 is severed by the hot cutting knife 101 and simultaneously forms two marking tags. One of the tags is designated 117c in FIG. 8 and it is attached to the upper end of the filled package at seal 119. The end portion 117a of the tape is attached at seal 112 to the portion of the netting above the clamp and comprises a price tag for the next package. Since two tags are formed at the same time, the tape 117 is provided only during alternate sealing operations.

The resulting package P is illustrated in FIG. 8 and comprises a length of the netting 1 which contains the packaged item, the netting being closed at the upper end by the seal 119 and closed at the lower end by the seal 112. The tag 117c is shown at the top of the package but it will be understood that for the next package the tag is at the lower end thereof.

The apparatus of the invention is structurally simple, compact and easily operated by one person, making it economical for use in supermarkets and other retail stores. The provision of a permanently attached tag is very desirable and the apparatus is readily adapted to packaging items of various sizes in packages of various lengths simply by adjusting the vertical position of the intermediate stage 23 and the blade 101.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for packaging items in heat-sealable plastic tubular netting comprising:

an endless conveyor having an upper stage, an intermediate stage, and a lower stage, a series of loading tubes carried by the upper stage spaced at equal intervals therearound, each of said loading tubes being adapted to hold on the exterior thereof a rucked supply of netting, a series of clamping units carried by the intermediate stage at equal intervals therearound corresponding to the spacing of the loading tubes, each of said clamping units comprising an upper set of clamping jaws and a lower set of clamping jaws spaced from the upper set, the conveyor being adapted for indexing movement to index each loading tube and the associated clamping unit from station to station, one of said stations being a loading station at which the netting having its lower end previously bunched and sealed may be drawn down for support of its lower end on the lower stage and loading of the lower portion of the tubing below the intermediate stage via the loading tube, after which the portion of the netting at the level of the intermediate stage may be bunched and inserted in the respective clamping unit and the upper and lower sets of clamping jaws of the latter closed to clamp the bunched portion of the netting at two vertically spaced points, and a second of said stations being a sealing and segmenting station having a fixed heated sealing and severing blade positioned for engagement by the bunched portion of the netting between the upper and lower sets of clamping jaws on indexing movement of the conveyor to carry the loaded netting to said sealing and segmenting station, said blade acting to form a seal for the upper end of the loaded portion of the netting and a seal for the lower end of the portion of the netting thereabove and to segment the netting therebetween.

2. Apparatus as set forth in claim 1 wherein said upper stage has a series of openings therein, one for each loading tube, said loading tubes extending upward from the upper stage in register with said openings, whereby the netting on each loading tube may be fed upward from the supply on the exterior of the loading tube, around the upper end of the tube, and downward through the tube and the respective opening.

3. Apparatus as set forth in claim 1 wherein the spacing of the intermediate and lower stages is adjustable for handling packages of different lengths.

4. Apparatus as set forth in claim 1 wherein the endless conveyor is in the form of a turret rotatable on a vertical axis.

5. Apparatus for packaging items in heat-sealable plastic tubular netting comprising:
a base,
a post extending upward from the base,
a sleeve rotatable on the post,
a loading tube platform carried by the sleeve for rotation therewith adjacent its upper end,
said platform having a circular series of openings therein spaced at equal intervals therearound, and carrying a series of loading tubes extending upward therefrom, each tube being in register with a respective opening, each tube being adapted to hold on the exterior thereof a rucked supply of netting, with the arrangement such that the netting may be fed upward from the supply around the upper end of the tube and downward through the tube and the opening,
a clamp-supporting platform carried by the sleeve for rotation thereof below the loading tube platform,
a series of clamping units, one for each loading tube, carried by the clamp-supporting platform at its periphery and spaced at equal intervals therearound corresponding to the spacing of the loading tubes,
each of said clamping units comprising an upper set of clamping jaws and a lower set of clamping jaws spaced from the upper set,
a table carried by the sleeve for rotation therewith below the clamp-supporting platform,
the turret being adapted for indexing rotation to index each loading tube and the associated clamping unit from station to station,
one of said stations being a loading station at which the netting having its lower end previously bunched and sealed may be drawn down for support of its lower end on the table and loading of the lower portion of the tubing below the clamp-supporting platform via the loading tube, after which the portion of the netting at the level of the clamp-supporting platform may be bunched and inserted in the respective clamping unit and the upper and lower sets of clamping jaws of the latter closed to clamp the bunched portion of the netting at two vertically spaced points, and a second of said stations being a sealing and segmenting station having a fixed heat sealing and severing blade positioned for engagement by the bunched portion of the netting between the upper and lower sets of clamping jaws on indexing movement of the conveyor to carry the loaded netting to said sealing and segmenting station, said blade acting to form a seal for the upper end of the loaded portion of the netting and a seal for the lower end of the portion of the netting thereabove and to segment the netting therebetween.

6. Apparatus as set forth in claim 5 wherein the clamp-supporting platform is adjustable on the sleeve toward and away from the table for handling packages of different lengths, and the heated blade is mounted for vertical adjustment for locating the blade between the sets of clamping jaws at any adjusted position of the clamp-supporting platform.

7. Apparatus as set forth in claim 5 wherein each of said clamping units comprises an overcentering spring arrangement for biasing the clamp jaws into an open position and into a closed position.

8. Apparatus as set forth in claim 5 wherein each opening in the loading tube platform is surrounded by an upwardly projecting rim for locating the loading tubes in position above the openings.

9. Apparatus as set forth in claim 5 wherein the loading station is also an unloading station and having at least one station intermediate the sealing and segmenting station and the loading and unloading station at which the seals may cool which the clamping jaws may be opened and the packages removed.

10. Apparatus as set forth in claim 5 wherein the clamping units are offset from the loading tubes.

11. Apparatus as set forth in claim 10 wherein the clamping units are offset from the loading tubes in forward direction with respect to the rotation of the turret, and the blade is similarly offset from the tube at the sealing and segmenting station.

References Cited

UNITED STATES PATENTS

| | | | |
|---|---|---|---|
| 1,686,787 | 10/1928 | Bates | 53—139 |
| 2,744,669 | 5/1956 | Ashe et al. | 53—391 X |

THERON E. CONDON, Primary Examiner

N. ABRAMS, Assistant Examiner

U.S. Cl. X.R.

53—391